3,074,793
PROCESS FOR THE PRODUCTION OF MEDIUM- TO LOW-CARBON FERROMANGANESE

August M. Kuhlmann, Niagara Falls, N.Y., assignor to Union Carbide Corporation, a corporation of New York
No Drawing. Filed Sept. 21, 1961, Ser. No. 139,603
7 Claims. (Cl. 75—133.5)

This invention relates to a two-step process for the production of medium- to low-carbon ferromanganese.

A common method for the manufacture of low-carbon and medium-carbon ferromanganese alloys is to smelt a charge of manganese ore, lime, and silicon together in an electric furnace. To carry out the reduction of the manganese oxides from the tetra- and trivalent state to the elemental state requires considerable quantities of costly silicon which in turn are oxidized to produce silica. The presence of silica in the charge results in losses of manganese to the slag, the loss being proportional to the content of silica in the slag. Furthermore, high silica in the charge results in high silicon in the product unless the slag is fluxed with lime. This is of particular concern when it is desired to meet a specification calling for less than 1 to 2 percent silicon in the final product. In addition, basic fluxes must be added to maintain a base-to-acid ratio which, when added to a large quantity of acid slag component, creates large slag volume in which metal values are easily entrapped.

Two-step reduction practices have been attempted in order to avoid some of the above-mentioned problems. However, all of these techniques have required double furnacing techniques or solid state or gaseous reduction steps, all of which require additional and specialized equipment.

It is an object of this invention, therefore, to provide an improved process for the manufacture of medium- to low-carbon ferromanganese.

Other objects will be apparent from the subsequent disclosure and appended claims.

The process which satisfies the objects of the present invention comprises smelting manganese ore with at least sufficient carbonaceous reducing agent to provide a melt containing substantially all of the manganese values in the manganous state without the substantial reduction of the manganese values to elemental manganese, transferring the melt to a ladle, and reducing the manganese values to elemental manganese with a silicon-reducing agent.

In the first step of the process it may be desirable to use more than the stoichiometric amount of carbonaceous reducing agent for the reduction of all the manganese to the manganous state. Thus, any excess of iron oxide may be reduced to the elemental metal. When the manganese-bearing slag is poured into the ladle for the second reduction step, the reduced iron may be left behind thereby effectively lowering the iron content of the final manganese product. It should be noted, however, that the excess of carbonaceous reducing agent should not be such as to cause formation of more than minor amounts of elemental manganese.

The melt produced in the first step should have a molar base-to-acid ratio of at least 1.6, i.e., the ratio $$\frac{MnO+CaO+MgO+BaO}{SiO_2}$$

should be 1.6 or higher. For specific variations in the process and in the products produced, higher ratios may be desirable.

The process may be operated as a lime-free process or lime may be added to produce a desired slag of particular composition. In most operations it is desirable to add substantially all of the lime necessary for the overall operation in the first process step to provide the prescribed base-to-acid ratio in the final slag. It should be noted that this includes sufficient lime to combine with the silica produced in the silicon reduction step. However, in the production of low-carbon ferromanganese, particularly when elemental silicon is used as the reducing agent it is desirable to add a small portion of the total amount of lime during the silicon reduction in the ladle to serve as a heat sink for the excessive quantities of heat evolved by the exothermic reduction of the manganous slag. If less lime is used in the first reduction step, the tapping temperature is lowered which results in less sensible heat when transferred to the ladle. More heat is generated when silicomanganese is added. If there is excessive heat, the refractories will be eroded. Insufficient heat produces a buildup of material in the ladle. The amount of lime which may be suitably added in the second reduction is that amount necessary to combine with the silica produced during the silicon reduction and, in addition, up to about ⅛ the total lime requirement.

Any suitable carbonaceous reducing agent may be utilized in the first step of the process. Because of the versatility and effectiveness of the overall process, coal and the lower grades of coke are quite satisfactory. The silicon-reducing agent may be elemental silicon or silicon alloys such as ferrosilicon. However, silicomanganese is particularly well suited for the process.

In carrying out the second step of the process, the silicon-reducing agent may be added to the melt in the ladle in the molten or solid state or may be part molten and part solid. The various reactants and additives may be introduced into the ladle simultaneously or in sequence. The mixture of reactants may be poured from one ladle to another to promote complete reaction. It has been found desirable to feed a stream of dry granular silicomanganese confluently with the stream of melt into the ladle. This eliminates the need for melting the reducing agent while simultaneously providing a heat sink for a portion of the excess heat from the exothermic reaction.

The process of the present invention may be varied to produce either high- or low-silicon products. Those variations will be discussed separately below.

Low-silicon ferromanganese can be produced directly from the manganous oxide-containing melt by addition thereto of the stoichiometric amount of silicon-reducing agent. If it is desired to produce a throw-away slag, sufficient lime should be incorporated to provide a final slag containing from about 6 to 12 weight percent MnO and having a base-to-acid ratio over 1.8.

The process is more effectively carried out if the slag produced simultaneously with the low-silicon ferromanganese is maintained high in manganese values. This, however, requires recovery of the manganese value from the slag if the favorable economics of the process are to be maintained. Fortunately, the slag is readily treated for this purpose.

If silicomanganese is a desired product, the first silicon reduction can be conducted to produce a non-disintegrating slag (about 20 to 25 percent MnO and higher). This slag can then be carbon-reduced in a furnace to the desired silicomanganese.

If the slag produced from the first silicon reduction contains in excess of 30 percent MnO (normally about 35 percent and higher), it may be reacted with ferromanganese silicon or ferrosilicon to produce high-silicon, low-carbon (0.1 percent maximum) ferromanganese and a slag. The slag may be utilized for silicomanganese production as before.

Alternatively, the slag may be reduced with ferromanganese-silicon followed by molten resiliconization with silicomanganese to produce 0.75 percent carbon ferromanganese containing 5 to 7 percent silicon.

Finally, the high-manganous oxide slag from the first silicon reduction may be reacted with regular silicomanganese to produce a novel product, high manganese, silicomanganese having a manganese content of at least 75 percent, a weight ratio of manganese to silicon of at least 5, and a maximum carbon content of 1.5 percent. This product is a superior deoxidizer for steels; the high manganese-to-silicon ratio results in a high MnO-to-$SiO_2$ ratio after deoxidation which, as has been shown by C. H. Herty, provides optimum conditions of melting point, viscosity, fluidity, and density, thereby increasing the case of separation of the deoxidized steel from the deoxidation products to give a cleaner deoxidized steel. Silicomanganese having such a manganese-to-silicon ratio is not normally obtainable by standard processes.

If it is desired to produce high-silicon ferromanganese directly from the carbon-reduced manganous oxide melt, a silicon-reducing agent is added to the melt in the stoichiometric amount to produce the desired product and a slag having a base-to-acid ratio of at least about 1.8. When demand for high-silicon ferromanganese is high, all of the melt can be so converted. When there is also a demand for low-silicon ferromanganese, only a portion of the melt is converted to high-silicon ferromanganese; a portion of the latter product is then employed to reduce the balance of the melt to low-silicon ferromanganese. Thus, by apportioning the amount of melt to be converted to high-silicon ferromanganese and the amount of this product to be recycled for production of the low-silicon product, two saleable products can be produced in relative proportions which are easily varied to match demand.

From the foregoing discussion, it has been shown that the subject process of partial carbon-reduction of ore in a furnace followed by silicon-reduction in a ladle permits production of a number of manganese-silicon alloys of low-to-medium carbon content; only a single furnace is required, and the versatile process permits easy change from one product to another depending on market demands. The advantages will be further seen from the following examples.

Typical ore compositions for the examples are shown in Table I.

TABLE I

| Component | Belgian Congo Ore, Percent | South African Ore, Percent |
|---|---|---|
| Mn | 51.3 | 55.0 |
| Fe | 1.9 | 1.4 |
| Avail. $O_2$ | 13.6 | 13.0 |
| $SiO_2$ | 3.6 | 3.5 |
| $Al_2O_3$ | 5.2 | 1.9 |
| P | 0.1 | 0.02 |

In the table, available $O_2$ indicates the amount of oxygen which must be reacted with the carbonaceous reducing agent in order to reduce all of the manganese values to the manganous state.

*Example I*

To illustrate the process of the present invention for producing low-silicon, low-carbon ferromanganese, 7500 pounds of Belgian Congo ore, 7500 pounds of South African ore, 900 pounds of low ash coal, and 4100 pounds of lime were fused in a tilting submerged arc electric furnace. When the charge was brought to complete fusion, the melt analyzed 3 percent available oxygen. At this point 17,500 pounds of the melt were tapped into a ladle while confluently 5400 pounds of ¼ inch by down silicomanganese analyzing 29.5 percent silicon, 0.09 percent carbon, 64.4 percent manganese, 0.04 percent phosphorus, and the balance iron were added. At the conclusion of the tap, the ladle contents were repoured into a second ladle for the purpose of bringing about more rapid and complete reaction. The bulk of the slag formed was poured off, and the balance, including metal and remaining slag, was cast into steel billet chills. The resulting alloy analyzed 89.6 percent manganese, 0.05 percent silicon, 0.04 percent carbon, and the balance iron. The slag contained 26.47 percent calcium oxide, 26.37 percent silicon dioxide, 27.94 percent manganese, and 0.18 percent iron.

*Example II*

A charge consisting essentially of 15,000 pounds of Belgian Congo ore, 1000 pounds of low ash coal, and 4200 pounds of lime was fused in a tilting submerged arc electric furnace. After the charge was completely fused, the melt analyzed 1.9 percent available oxygen. About 17,000 pounds of the melt were tapped into a ladle while confluently 7700 pounds of solid granular ¼ inch by down mixture consisting of 75 percent silicomanganese (19.6 percent silicon, 1.3 percent carbon, 67.9 percent manganese, balance iron) and 25 percent cobbings (59.7 percent manganese, 2.2 percent carbon, 18.6 percent silicon, balance iron) were added. At the conclusion of the tap, the ladle contents were poured into another ladle to complete the reaction. The bulk of the slag was poured off, and the balance was cast into steel billet chills. The resulting alloy analyzed 81.6 percent manganese, 1.0 percent silicon, 1.3 percent carbon, and the balance iron. The slag contained 26.69 percent calcium oxide, 25.91 percent silicon dioxide, 0.15 percent iron, and 27.84 percent manganese.

*Example III*

In carrying out a process in accordance with the invention for the production of low-silicon, medium-carbon ferromanganese, a charge consisting of 1000 parts of high-grade manganese ore, 83 parts of coal, and 217 parts of lime was fused in a submerged arc electric furnace. After bringing the charge to complete fusion, at which time the melt analyzed 45.90 percent manganese and 0.39 percent "available oxygen," it was tapped into a ladle while at the same time and confluently, a mix of solid granular silicomanganese and silicon so proportioned to give an average silicon content of 22 percent was fed. The resulting alloy analyzed 82.02 percent manganese, 0.39 percent silicon, and 0.73 percent carbon. The resulting slag analyzed 29.51 percent manganese, 23.52 percent $SiO_2$, 26.92 percent CaO, and 2.80 percent MgO.

One of the important features of the present invention is the ability to utilize the slag from the second stage of the process as a source of manganese for the production of a variety of alloys low in carbon. This slag is a suitable starting material for the production of a high-silicon ferromanganese alloy by treating it with silicon-reducing agent as before.

*Example IV*

In producing high-silicon ferromanganese from slag from low-silicon, low-carbon alloy production, 30,200 pounds of slag analyzing 24.73 percent oxidic manganese, 27.87 percent $SiO_2$, 28.32 percent CaO, produced in accordance with the method of Example III, were treated with 3,700 pounds of molten ferromanganese silicon analyzing 29.80 percent silicon, 0.062 percent carbon, to produce 5,495 pounds of an alloy analyzing 81.67 percent manganese, 13.55 percent silicon, 0.050 percent carbon, and a slag analyzing 20.08 manganese, 29.11 CaO, 29.85 $SiO_2$.

*Example V*

In producing high-silicon ferromanganese from slag from low-silicon, medium-carbon alloy production, 20,100 pounds of slag, analyzing 29.88 percent manganese, 25.93 percent $SiO_2$, 20.70 percent CaO, produced in accordance with the method of Example III, were treated with 3000 pounds of molten ferromanganese silicon analyzing 36 percent silicon, 59.77 percent manganese, 0.080 percent carbon to produce 4,310 pounds of an alloy analyzing 82.56 manganese, 13.64 silicon, 0.080 carbon and a slag analyzing 21.08 manganese, 28.13 CaO, 28.36 $SiO_2$.

*Example VI*

To illustrate slag reduction with solid reductant, 20,350 pounds of slag produced in accordance with Example III from low-silicon, medium-carbon alloy production, analyzing 30.55 percent manganese, 24.7 percent $SiO_2$, 20.8 percent CaO, were treated with 2,900 pounds of solid ferromanganese silicon, analyzing 33.26 silicon, 62.16 manganese, 0.103 carbon, to produce 3,790 pounds of manganese-silicon alloy, analyzing 14.46 percent silicon, 81.89 percent manganese, 0.072 percent carbon and a slag containing 24.62 manganese.

*Example VII*

Following the procedure of Examples III and IV, 1070 pounds of molten slag having 31.09 percent manganese were treated with 220 pounds of ferromanganese silicon. The resulting alloy weighing 240 pounds analyzed 79.55 percent manganese, 16.22 percent silicon, and 0.08 percent carbon.

*Example VIII*

In practicing the invention for the production of a 10 percent silicon ferromanganese alloy, a charge consisting essentially of high-grade ore and coal was fused in a submerged arc electric furnace. The composition of the charge was as follows: 59.84 percent total manganese, 2.70 percent as $MnO_2$, 5.90 percent $SiO_2$, 0.47 percent CaO, and 1.19 percent MgO.

After bringing the charge to complete fusion, 750 pounds of the melt were tapped into a ladle. To the ladle was then added molten ferromanganese silicon (analyzing 31.04 percent silicon) until 400 pounds were added. The resulting alloy amounting to about 516 pounds analyzed 81.75 percent manganese and 10.03 percent silicon. The slag which resulted amounted to approximately 705 pounds and contained about 38.37 percent manganese.

*Example IX*

Following procedures and employing the equipment of Example VIII, 880 pounds of melt were reacted with 400 pounds of ferromanganese silicon to yield 523 pounds of alloy and 760 pounds of slag. The composition of the reactants and products are set forth in the table below.

| Melt | FeMn-Si | Alloy | Slag |
|---|---|---|---|
| Total, Mn 59.36 as $MnO_2$, 6.96 $SiO_2$, 4.98 CaO, 0.98 MgO, 0.72 | Mn, 64.5 Si, 30 C, 0.1 max. | Mn, 82.63 Si, 8.78 | Mn, 38.67 |

*Example X*

In carrying out a process in accordance with the invention for the production of low-silicon ferromanganese, a charge, consisting essentially of high-grade manganese ore of the composition of Table I, coal, and lime, is fused in a tilting, submerged arc electric furnace, the composition of the charge being as follows:

| | Lb. |
|---|---|
| Belgian Congo Mn ore | 15,000 |
| Low-ash coal | 900 |
| Lime | 4,100 |

After bringing the charge to complete fusion, the melt analyzing 3 percent "available oxygen," 8750 pounds of the melt are tapped into a ladle, while at the same time and confluently, solid granular ¼ by D silicomanganese of the composition 29.5 percent silicon, 64.6 percent manganese, 0.09 percent carbon, and 0.04 percent phosphorus is fed until 2700 pounds are added. At the conclusion of the tap, the ladle contents are immediately repoured into another ladle for the purpose of bringing about a more rapid and complete reaction. The bulk of the slag thus formed is poured off to be routed to a furnace for producing silicomanganese to be used in the above reaction step. The resulting alloy analyzed about 80 percent manganese, 20 percent silicon, and 0.1 percent carbon; 2100 pounds are reacted with 8750 pounds more of the melt in a ladle as above. The slag is poured off and used to make more silicomanganese as before, while the resulting alloy analyzing 80 percent manganese, 1.5 percent silicon, and 1.25 percent carbon is cast into steel billet chills.

*Example XI*

To produce the novel high manganese-to-silicon ratio, silicomanganese described previously, standard molten silicomanganese (typically 66.5 percent manganese, 19.5 percent silicon, 1.5 percent carbon, and a maximum of 0.05 percent phosphorus) are reacted with high-manganese slag (typically about 30–35 percent manganese) to produce an alloy analyzing typically about 79 percent manganese, 15 percent silicon, 1.25 percent carbon, and a maximum of 0.05 percent phosphorus and a slag containing about 25 percent MnO.

Advantages of the new process include better recovery of manganese and lower carbon content of the alloy for the same carbon content of silicomanganese, due to improved recovery of manganese from ore and a suitable usage of silicomanganese.

Another factor contributing to a lower carbon product is the fact that all reduction is carried out in a ladle away from possible carbon contamination from electrodes in an electric furnace.

A still further advantage lies in the fact that the slag resulting from the ladle reaction is sufficiently rich in manganese to serve as an intermediate in subsequent metallurgical reactions.

The product alloy is sounder (less porous) than conventional products.

This application is a continuation-in-part of copending application Serial Number 77,825 filed December 23, 1960.

What is claimed is:

1. A process for the production of medium-to-low carbon ferromanganese which comprises smelting manganese ore with at least sufficient carbonaceous reducing agent to provide a melt containing substantially all of the manganese values in the manganous state without substantial reduction of the manganese values to elemental manganese and having a molar based-to-acid ratio of at least 1.6; transferring the melt to a ladle; and adding to said melt sufficient of a silicon-reducing agent to reduce manganese value to produce a ferromanganese alloy and a slag having a base-to-acid ratio of at least about 1.8.

2. A process in accordance with claim 1 wherein sufficient lime is introduced during the carbon and silicon reduction steps to produce a throw-away slag containing from about 6 to 12 weight percent MnO.

3. A process in accordance with claim 1 for the simultaneous production of high-silicon and low-silicon ferromanganese of low-to-medium carbon content wherein the ladle silicon reduction is conducted on only a portion of the melt to produce high-silicon ferromanganese, and a quantity of the high-silicon ferromanganese so produced is reacted with the balance of said melt in a ladle to produce low-silicon ferromanganese.

4. A process in accordance with claim 1 wherein the silicon reduction step is conducted to produce a high-manganese slag containing in excess of 30 percent MnO and reacting said slag with a silicon reductant to produce a silicon-containing manganese alloy.

5. A process in accordance with claim 4 wherein said high-manganese slag is reacted with a reductant selected from the group consisting of ferromanganese silicon and ferrosilicon to produce a high-silicon, low-carbon ferromanganese and a second slag.

6. A process in accordance with claim 4 wherein said high-manganese slag is reduced with ferromanganese silicon, and the alloy so produced is resiliconized with silicomanganese to produce 0.75 percent carbon ferromanganese containing 5 to 7 percent silicon.

7. A process in accordance with claim 4 wherein said high-manganese slag is reacted with regular silicomanganese to produce high-manganese silicomanganese having a manganese content of at least 75 percent, a weight ratio of manganese-to-silicon of at least 5, and a maximum carbon content of 1.5 percent.

References Cited in the file of this patent
UNITED STATES PATENTS

| | | |
|---|---|---|
| 1,768,112 | Brenan | June 24, 1930 |
| 3,043,681 | Udy et al. | July 10, 1962 |